April 21, 1964 W. B. FAHRENBACH 3,129,542
DISPLAY CARTON PACKING APPARATUS
Filed June 9, 1955 6 Sheets-Sheet 1
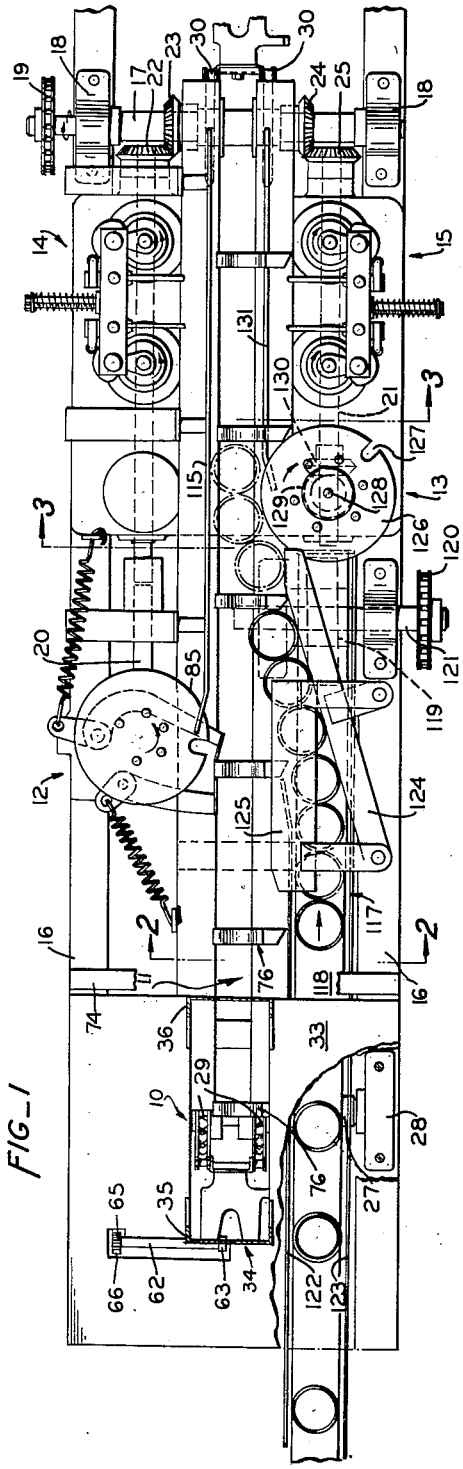
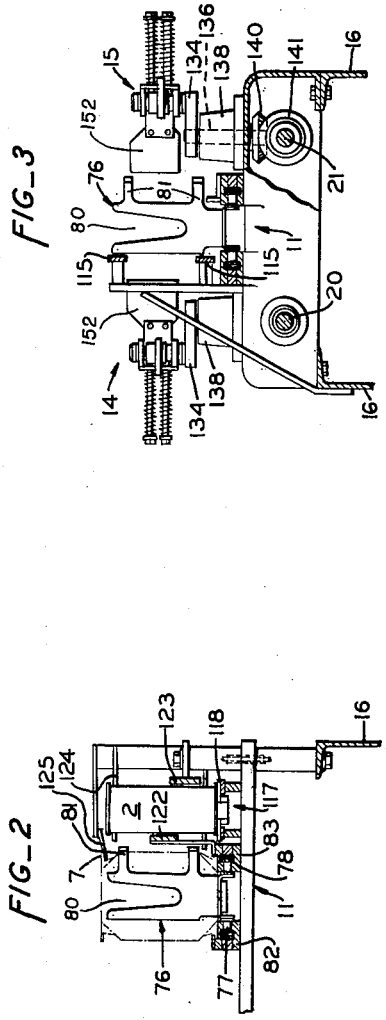
INVENTOR.
WOLFGANG B. FAHRENBACH
BY
Boyken, Mohler & Wood
ATTORNEYS April 21, 1964 W. B. FAHRENBACH 3,129,542
DISPLAY CARTON PACKING APPARATUS
Filed June 9, 1955 6 Sheets-Sheet 2
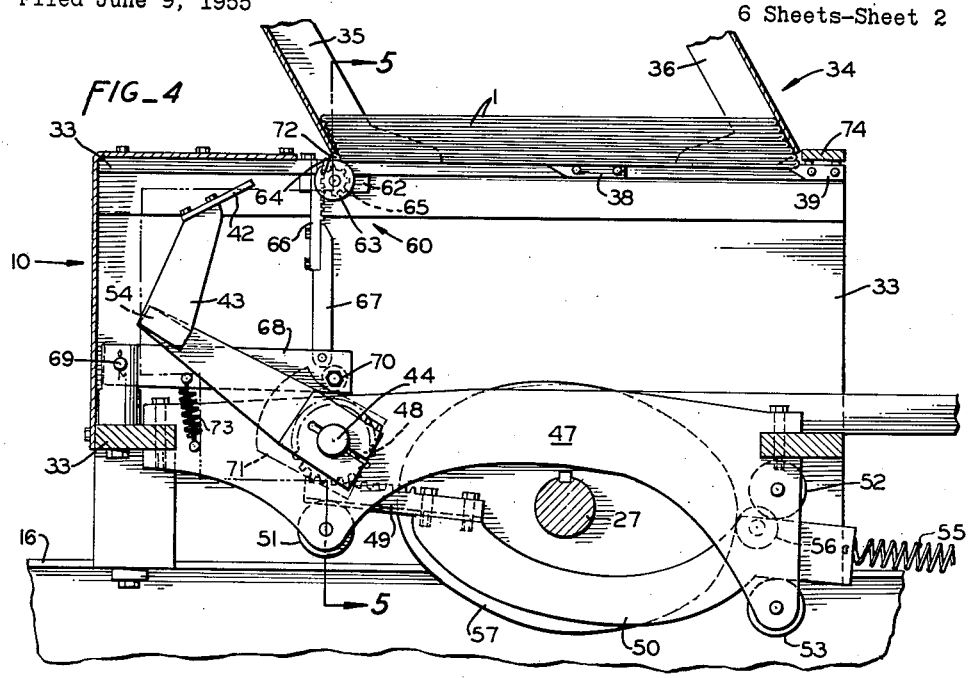
FIG_4
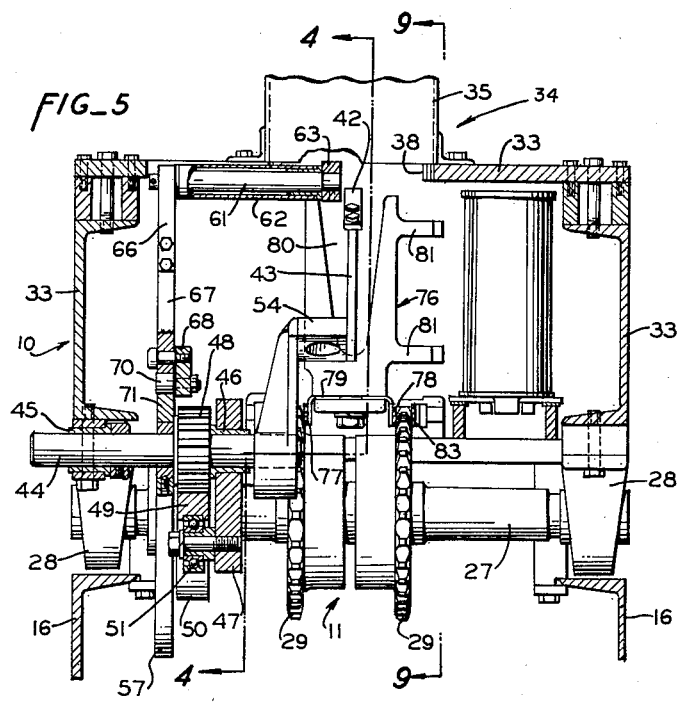
FIG_5
INVENTOR.
WOLFGANG B. FAHRENBACH
BY
Boyken, Mohler & Wood
ATTORNEYS April 21, 1964     W. B. FAHRENBACH     3,129,542
DISPLAY CARTON PACKING APPARATUS
Filed June 9, 1955     6 Sheets-Sheet 3
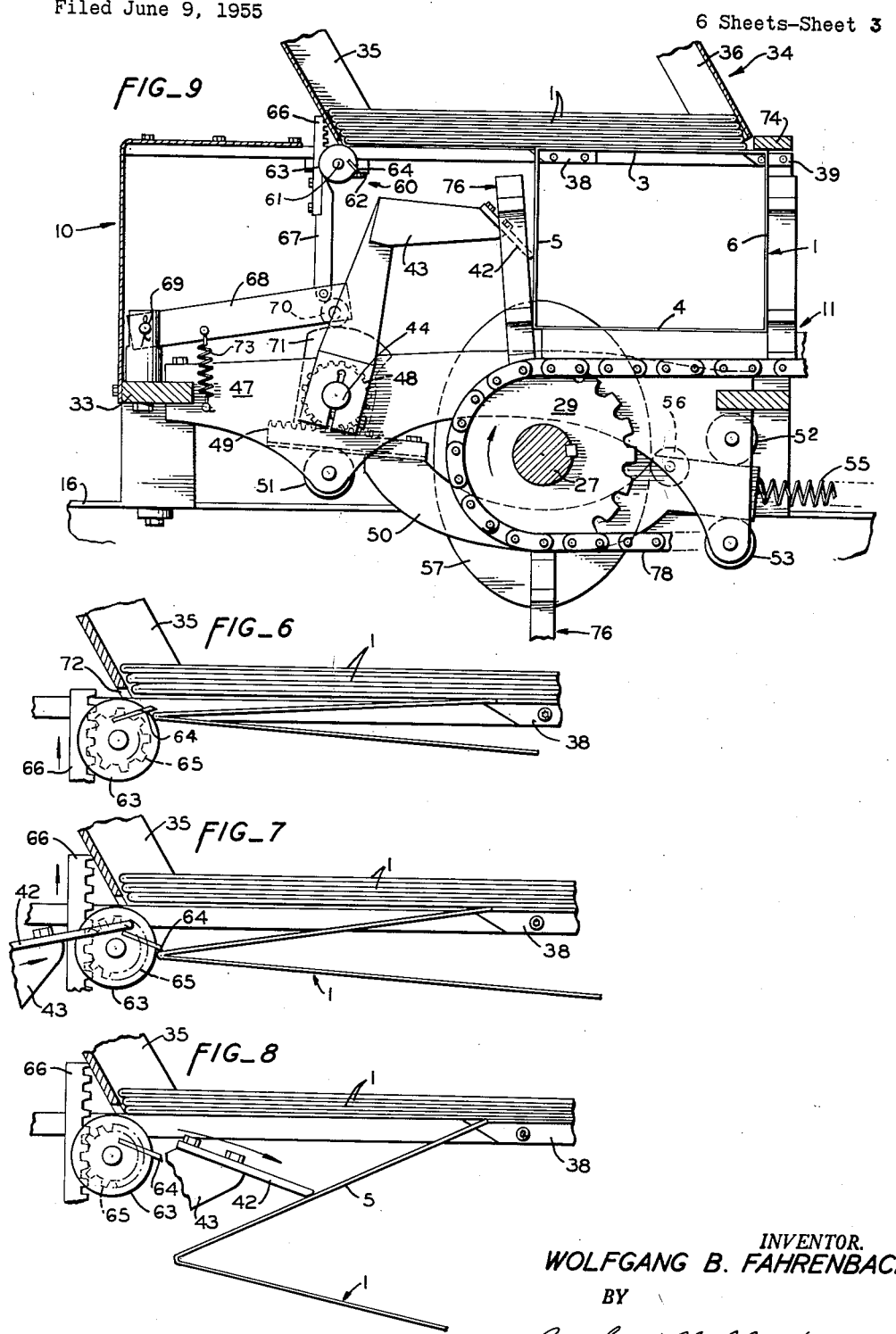
INVENTOR.
WOLFGANG B. FAHRENBACH
BY
*Boyken, Mohler & Wood*
ATTORNEYS April 21, 1964 W. B. FAHRENBACH 3,129,542
DISPLAY CARTON PACKING APPARATUS
Filed June 9, 1955 6 Sheets-Sheet 4
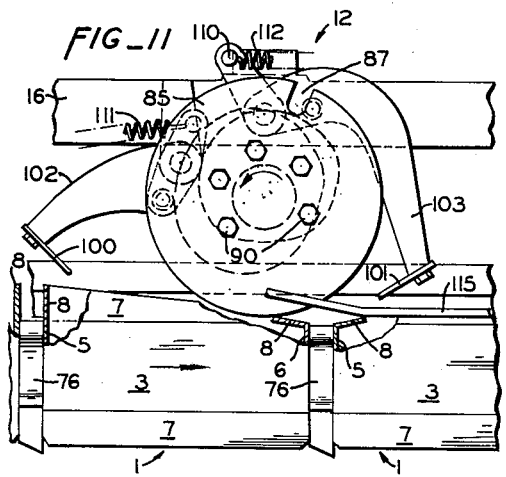
INVENTOR.
WOLFGANG B. FAHRENBACH
BY
Boyken, Mohler & Wood
ATTORNEYS April 21, 1964 W. B. FAHRENBACH 3,129,542
DISPLAY CARTON PACKING APPARATUS
Filed June 9, 1955 6 Sheets-Sheet 5
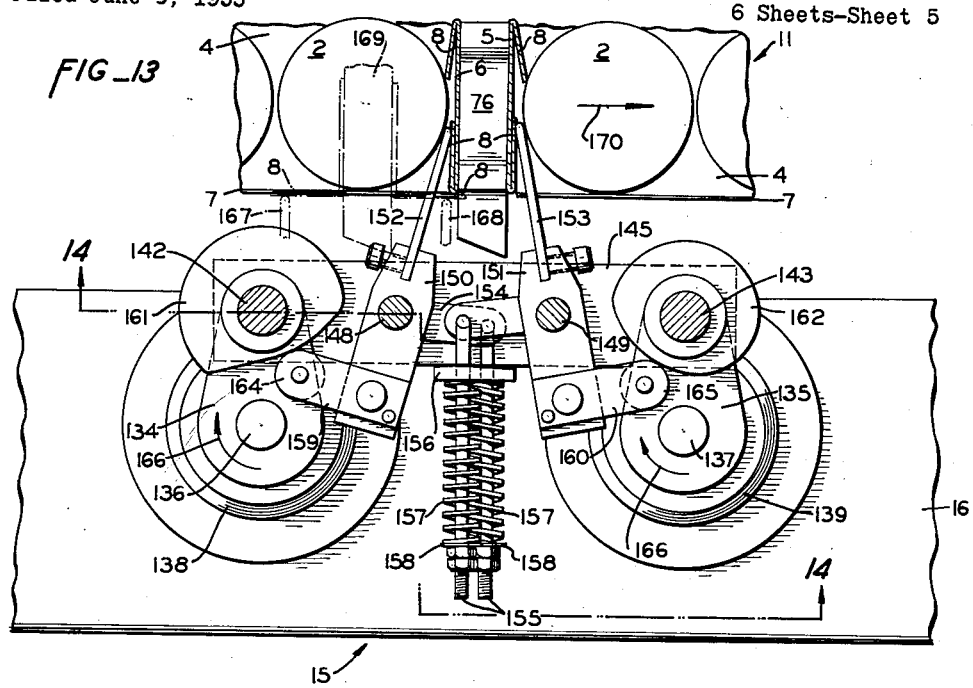
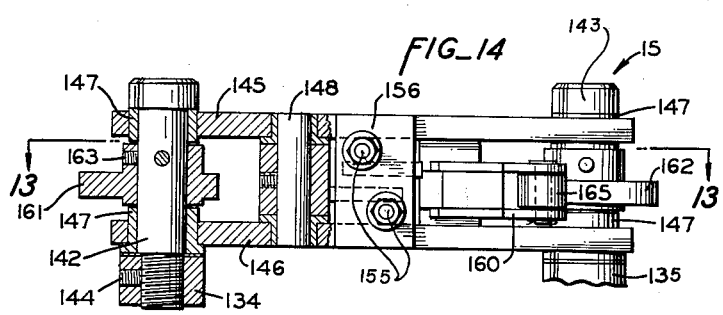
INVENTOR.
WOLFGANG B. FAHRENBACH
BY
Boyken, Mohler & Wood
ATTORNEYS April 21, 1964     W. B. FAHRENBACH     3,129,542
DISPLAY CARTON PACKING APPARATUS
Filed June 9, 1955     6 Sheets-Sheet 6
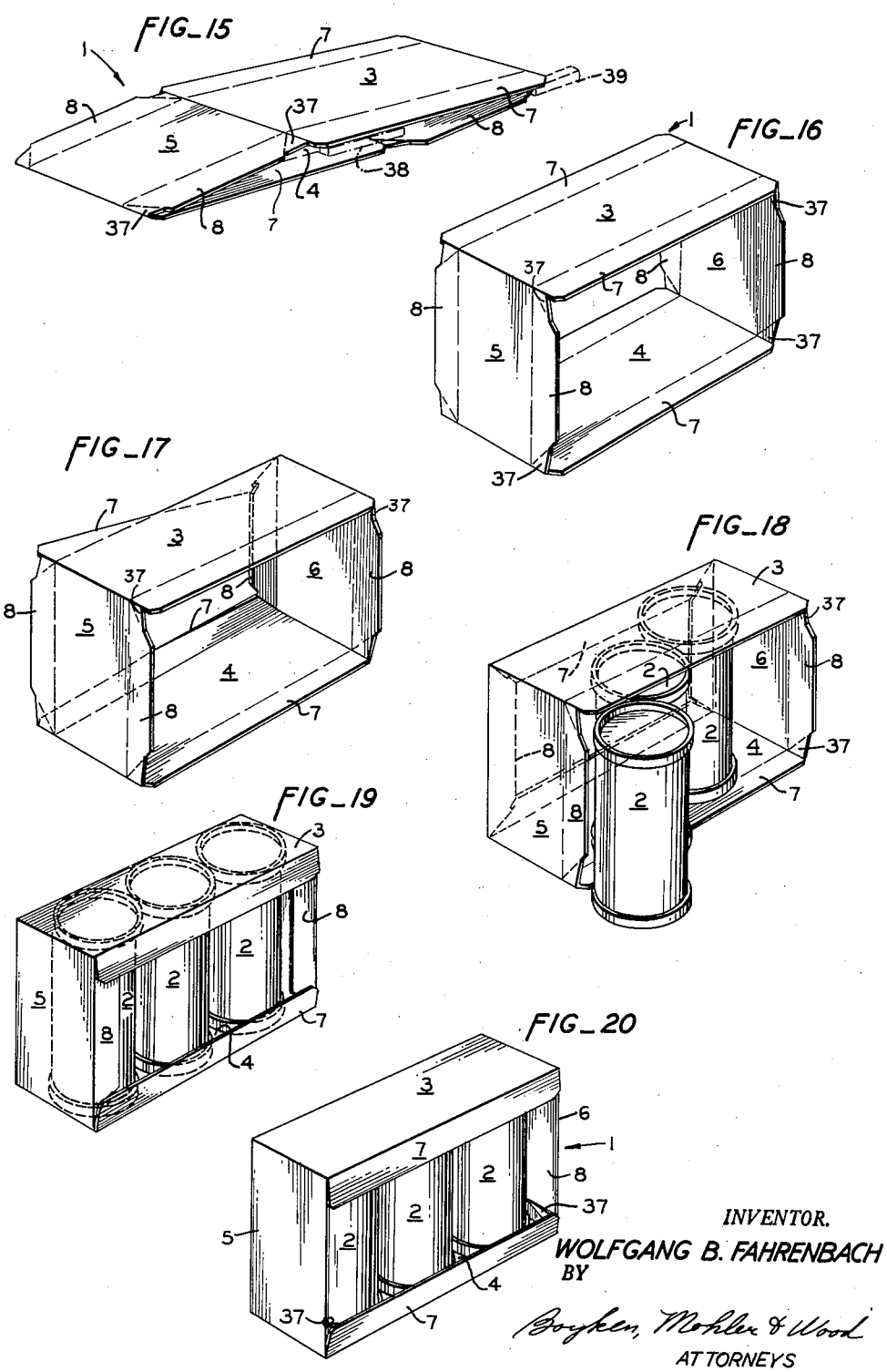
INVENTOR.
WOLFGANG B. FAHRENBACH
BY
ATTORNEYS United States Patent Office
3,129,542
Patented Apr. 21, 1964

3,129,542
DISPLAY CARTON PACKING APPARATUS
Wolfgang B. Fahrenbach, Oakland, Calif., assignor, by mesne assignments, to Andre-Matic Machinery Company, San Leandro, Calif., a corporation of California
Filed June 9, 1955, Ser. No. 514,150
9 Claims. (Cl. 53—48)

This invention relates to apparatus and method for packing articles such as cylindrical cans in a display carton of the type described in application for Letters Patent, Serial No. 375,637, filed August 21, 1953, by Udell C. Walk, for "Portable Display Carton," and now abandoned.

One of the objects of this invention is the provision of a novel method of forming and packing a display carton.

It is another object of this invention to provide apparatus for carrying out the above method.

Still another object of this invention is the provision of a method for packing display cartons that is relatively fast and easy to perform.

Yet another object of this invention is the provision of apparatus for forming, filling, and securing the contents in a display carton.

It is a further object of this invention to provide apparatus for rapidly and automatically packing a display carton, starting with a carton blank and ending with a completed, packed carton.

A still further object of this invention is the provision of means for expanding a carton blank to an open position, means for inserting articles in such carton, and means for securing said carton in enclosing relation to said articles.

Other objects and advantages will become apparent from the following description taken in connection with the accompanying drawings, in which:

FIG. 1 is a top plan view of the apparatus of this invention;

FIGS. 2, 3 are cross sectional views taken substantially along lines 2—2 and 3—3, respectively, of FIG. 1;

FIG. 4 is an enlarged vertical sectional view of the carton feed magazine and opening mechanism of the apparatus of FIG. 1, as seen generally from line 4—4 of FIG. 5;

FIG. 5 is a cross sectional view taken generally along line 5—5 of FIG. 4;

FIGS. 6, 7, 8, are enlarged views of a portion of the carton feed and opening mechanism of FIG. 4 showing the successive operations performed thereby;

FIG. 9 is a vertical sectional view taken generally along line 9—9 of FIG. 5 showing a carton in fully open position;

FIG. 10 is an enlarged top plan view of the carton panel and flap extension folding mechanism of the apparatus of FIG. 1, shown in operative, extension folding position;

FIG. 11 is a top plan view similar to FIG. 10, but showing the mechanism in its inoperative position;

FIG. 12 is a cross sectional view taken generally along line 12—12 of FIG. 10;

FIG. 13 is an enlarged horizontal sectional view of one of the flap extension tucking mechanisms of the apparatus of FIG. 1, shown at the end of its operative stroke, as seen generally from line 13—13 of FIG. 14;

FIG. 14 is a partly elevational, partly sectional view taken generally along line 14—14 of FIG. 13; and, FIGS. 15 through 20 illustrate successive steps in the method of this invention of packing cans in the display carton shown.

The apparatus and method of this invention are adapted to pack a display carton 1, such as is shown in FIG. 20, with upright, cylindrical cans 2 or the like. Such carton is seen to comprise top and bottom panels 3, 4 extending over the top and bottom ends of a row of cans 2. Said top and bottom panels are joined by opposed end panels 5, 6, (FIG. 16) which extend across the side of each end can in said row.

Panel extensions 7 are formed along each side edge of top and bottom panels 3, 4 and are foldable from a position coplanar with said top and bottom panels to a position extending toward each other and overlying the sides of the cans 2 at the top and the bottom ends thereof. Flap extensions 8 are provided along each edge of end panels 5, 6 and are foldable from a position coplanar with said end panels to a position overlying the inside face of said end panels. The ends of flap extensions 8 are respectively connected with the ends of panel extensions 7 by corner pieces.

When a row of cans 2 occupies carton 1 as shown in FIG. 20, flap extensions 8 are folded into the space between end panels 5, 6 and the end cans in such row. In this manner, flap extensions 8 serve to yieldably retain panel extensions 7 in the opposed, coplanar relationship shown in enclosing relation with cans 2.

It will be noted that the carton 1 of FIG. 20 is formed from a generally rectangular blank shown in FIG. 16 in which panel extensions 7 are coplanar with top and bottom panels 3, 4 and flap extensions 8 are coplanar with end panels 5, 6. When the carton is in this fully open position, it may be collapsed to the substantially flat position shown in FIG. 15. Hence, the blanks from which cartons 1 are formed may be readily stacked vertically in such collapsed condition and thereby occupy little storage volume.

In general, the method of this invention envisions packing the carton shown with a row of articles, such as cans 2, by first expanding the carton blank from the collapsed position of FIG. 15 to the fully open position of FIG. 16. When so opened the carton 1 may be moved along a path of travel while the panel extensions 7 and flap extensions 8 are folded to a generally coplanar position on one side only of said carton (FIG. 17). Then the row of cans 2 may be inserted into the carton through the other side thereof (FIG. 18), and the panel extensions and flap extensions on said latter side are folded to a coplanar position overlying the sides of said cans (FIG. 19).

In the next step, flap extensions 8 are tucked into the space between the end cans of the row and end panels 5, 6 (FIG. 20). Hence, the completely packed carton is formed in which the end cans of the row within said carton cooperate with flap extensions 8 to hold the carton in enclosing relation with said cans.

Referring to FIG. 1, the apparatus of this invention is seen to comprise a number of mechanisms for performing the various steps in packing carton 1. Generally this apparatus comprises a carton blank feeding and opening mechanism 10 and a carton conveyor 11 (FIGS. 1, 4, 5, 9), extension flap folding mechanisms 12, 13 (FIGS. 1, 10, 11, 12), and flap extension tucking mechanisms 14, 15 (FIGS. 1, 3, 13, 14). These several mechanisms are mounted on a pair of generally parallel horizontal frame members 16 (FIG. 1) and are driven from a main drive shaft 17, journalled in bearings 18 at one end of said frame. Shaft 17 may be driven through sprocket wheel and chain drive 19 by any suitable power source such as an electric motor (not shown). Shaft 17 drives a pair of horizontal shafts 20, 21 generally parallel to frame member 16 (FIGS. 1, 3) through pairs of meshed bevel gears 22, 23, 24, 25.

At the other end of frame 16 from shaft 17, a shaft 27 journalled in bearings 28, carries sprocket wheels 29 (FIGS. 1, 5, 9). Conveyor 11 (to be later described in more detail) extends between sprocket wheels 29 and a pair of sprocket wheels 30 (FIG. 1) on shaft 17, which latter shaft thereby drives said carton conveyor.

Mounted on any suitable superstructure 33 (FIGS. 4, 5) above shaft 27 is a feed magazine generally designated 34. Said feed magazine comprises an opposed pair of channel members 35, 36 (FIGS. 4, 5) extending upwardly from superstructure 33 and inclined at a moderate angle to the vertical. Said channel members are adapted to embrace opposite end portions of cartons in a generally vertical stack of flat collapsed cartons and which cartons are adapted to feed downwardly through the open lower end of feed magazine 34.

The cartons in the stack are oriented with the top panel and one end panel substantially coplanar and overlying the other end panel and the bottom panel, respectively. The top panel of the carton is forward of the bottom panel relative to the directional movement of the carton through the apparatus of this invention (to the right in FIGS. 1, 4).

It will be noted from FIG. 15 that the combined width of the bottom panel 4 and its panel extensions 7 is somewhat less than the combined width of panel 3 and its panel extensions. It is also seen that flap extensions 8 are cut away at corner pieces 37 (FIGS. 15, 16), where they are connected to panel extensions 7. The stack of collapsed cartons in feed magazine 34 is supported only by a pair of carton dogs 38, 39 (FIG. 4) on each side of the lower end of magazine 34. Carton dogs 38, 39 are placed adjacent opposite ends of the top panel of the lowermost carton in said stack and because of the narrowness of bottom panel extensions 7 and the cut away portions at 37, said carton dogs contact only the panel extensions integral with top panel 3. The lowermost carton is then supported only by its top panel and panel extensions and the remainder of said carton is free to drop out of the open bottom end of said magazine.

Since the cartons in feed magazine 34 have usually been stacked in a collapsed position for a considerable period of time, the lowermost carton in said stack will ordinarily not open merely because of the weight of its bottom panel even though this carton is provided with weakened folding lines along the junctures between the top, bottom and end panels.

Hence, it is necessary to provide the carton opening mechanism shown in FIGS. 4 through 9 and designated generally by reference numeral 10. Said opening mechanism comprises a carton opening finger 42 mounted at the upper end of an arm 43 which is secured to a shaft 44. Said shaft 44 is journaled in bearing 45 secured to superstructure 33 and bearing 46 mounted on auxiliary frame member 47 rigid with said superstructure. In this manner finger 42 and arm 43 are supported for swinging forwardly in the direction of movement of conveyor 11.

Also secured to shaft 44 is spur gear 48 which is in mesh with a generally horizontal rack 49 mounted at the end of an arm 50. The end of rack 49 remote from gear 48 is reciprocable between gear 48 and a roller 51 while the other end of arm 50 that is opposite rack 49 is reciprocable between a pair of rollers 52, 53. Rollers 51, 52 and 53 are all supported for rotation on frame member 47 (FIG. 4). The reciprocation of arm 50 and rack 49 drives finger 42 in a swinging arc from its rearward position shown in FIG. 4 to its forward position of FIG. 9. It will be noted in FIG. 5 that although arm 43 is secured to shaft 44 off center of the machine, the offset in said arm, at 54, positions finger 42 along the longitudinal medial line of feed magazine 34.

The reciprocatory drive for arm 50 and rack 49 is provided by compression spring 55, one end of which is secured to frame 16 for urging arm 50 rearwardly of the direction of conveyor 11. Arm 50 is also provided near its forward end with a cam follower 56, (FIG. 4), in engagement with the periphery of a symmetrical radial cam 57. Cam 57 is keyed to shaft 27 and is so designed to reciprocate arm 50 in conjunction with spring 55 through two complete cycles for each revolution of said shaft.

In order to pull the rear end of the collapsed carton down from the bottom of feed magazine 34 in a position to be struck by finger 42, a carton trip, generally designated 60 (FIG. 4), has been provided. Said carton trip comprises a generally horizontal shaft 61 (FIG. 5) mounted on superstructure 33 in bearing 62 and extending under the rear edge of channel 35 of the feed magazine. At one end shaft 61 is provided with a wheel 63 having a blade 64 extending outwardly therefrom generally along a secant with respect to the periphery of said wheel. At the other end of shaft 61 a spur gear 65 is secured thereto and is in mesh with a generally vertically extending rack 66.

Said rack 66 extends upwardly from an elongated, generally vertical arm 67 which is pivoted to one end of a generally horizontal lever 68. The other end of lever 68 is pivotally secured to superstructure 33 by pin 69. The end of lever 68 which is adjacent arm 67 is also provided with a cam follower 70 which is in engagement with the periphery of a quick rise, long dwell, radial cam 71, secured to shaft 44 for rotation therewith.

The arrangement of cam 71 is such that upon swinging of arm 43 by rack 49 said cam drives arm 67 and rack 66 upwardly at a rapid rate. This causes shaft 61 and wheel 63 to rotate bringing blade 64 into engagement with the rear edge of the lowermost collapsed carton in feed magazine 34. It will be noted that the rear side of channel member 35 is recessed as at 72 to allow access of blade 64 to said carton. A tension spring 73 secured between lever 68 and frame 47 acts to keep follower 70 in engagement with cam 71 and to return rack 67 to its lower position shown in FIG. 4.

The operational steps of the carton trip and opening mechanisms is shown from their starting position in FIG. 4 through 6, 7, 8 to the end position of FIG. 9. It is noted in FIG. 6 that blade 64 of carton trip 60 first pulls the rear end of collapsed carton 1 downwardly so that the rear end panel 5 of said carton may be engaged by finger 42 (FIG. 8) and thereby pushed to the fully-open position of FIG. 9. The action of carton trip 60 and finger 42 also moves the lowermost carton 1 slightly forwardly on support dogs 38, 39. It is noted in FIGS. 4, 9 that a stop member 74 extends across the end of feed magazine 34 over support dogs 39 so as to prevent more than a single carton from being urged forwardly by finger 42. In this manner the top panel and its extensions of the lowermost carton in the stack is supported by dogs 38, 39 in a position to be urged forwardly through the space between stop member 74 and dogs 39.

When carton 1 is in the fully-open position shown in FIG. 9, supported by carton dogs 38, 39, bottom panel 4 of said carton then rests on the upper run of carton conveyor 11. Conveyor 11 comprises a pair of chains 77, 78 extending between and around sprocket wheels 29, 30 and having a plurality of spaced flights 76 at right angles thereto. In FIG. 5, it is seen that each flight 76 is secured by a generally U-shaped clip 79 to chains 77, 78. Flights 76 are spaced apart the length of top and bottom panels 3 and 4 of carton 1 and chains 77, 78 are timed to bring one of said flights into contact with rear end panel 5 of carton 1 when said carton is in a fully opened position supported by dogs 38, 39 as shown in FIG. 9. It will also be noted that another flight is adjacent front end panel 6 of said carton so that said carton is bounded by a pair of said flights.

As chains 77, 78 move forwardly, flights 76 move each successive carton 1 along a generally horizontal path of travel away from feed magazine 34. Since flights 76 are generally at right angles to chains 77, 78 they support the fully-open carton in a rectangular position throughout its travel along conveyor 11.

Flights 76 (FIGS. 2, 5) is bifurcated to provide a central recess 80 for passing finger 42 and arm 43 of the carton opening mechanism. Finger 42 thereby expands the carton from the flat collapsed position to the rectangular, fully opened position of FIG. 9 where said carton may be picked up and moved along a path of travel by flight 76. It is also noted that each flight 76 is provided with a pair of transversely extending projections 81 for a purpose to be later described. The upper run of chains 77, 78 are supported throughout the length by a pair of horizontally extending tracks 82, 83 secured to frame 16.

As each carton 1 is moved along by conveyor 11 it first reaches the station of the flap extension folding mechanism 12 illustrated in FIGS. 10 through 12. Said mechanism comprises a pair of similar, vertically spaced rotatable disks 85, 86 each of which is provided with a notch 87 opening outwardly of the edge thereof. Between disks 85, 86 are a pair of dissimilar radial cams 88, 89 each of which is secured to but spaced from its adjacent disk by bolts 90 and surrounding spacer rings 91. Cams 88, 89 are spaced apart by a cylindrical member 92, which, along with cams 88, 89, is centrally apertured to receive the reduced portion 93 of a vertically extending shaft 94. The end of reduced portion 93 projecting upwardly from cam 88 is threaded to receive nut 95 which acts to secure the assembly of cam 88, cylinder 92 and cam 89 against the shoulder formed against the reduced portion 93 and the remainder of shaft 94.

Shaft 94 is journalled in bearing 96 and is provided at its lower end with a bevel gear 97 in mesh with a bevel gear 98 on horizontal shaft 20. In this manner, the rotation of shaft 20 transmits a similar rotation to vertical shaft 94 thereby causing disks 85, 86 and cams 89, 90 to continuously rotate in a counterclockwise direction as viewed in FIG. 10. Since the cartons are moved in the direction from left to right, as seen in FIG. 10, by conveyor 11, the portions of disks 85, 86 adjacent thereto are moving in the same direction.

Disks 85, 86 are timed so that the flap extension 8 on rear panel 5 of each carton 1 is caught in notches 87. Disks 85, 86 are adapted to move faster than conveyor 11 thereby causing said flap extension to be folded in the direction of movement of the carton. As the carton is moved forwardly (to the right) from the position of FIG. 10, flap extension 8 on the rear end panel 5 is folded to a position substantially coplanar with the edge of top panel 3 (FIG. 11). At the same time the flap extension of the front end panel 6 of the succeeding carton is urged against the periphery of disks 85, 86 and is folded in the opposite direction as shown in FIG. 11.

Since panel extensions 7 are connected to flap extensions 8 this folding of the flap extensions also folds the panel extensions into opposed, substantially coplanar relationship. In FIG. 11 it will be noted that the folding of flap extension 8 on front end panel 6 causes the front ends of panel extensions 7 on the same side of carton 1 to be folded toward each other. In this manner the panel and flap extensions on one side of the carton are folded to the opposed, substantially coplanar relationship shown in FIG. 18.

It has been found that folding flap extensions 8 by means of disks 85, 86 as described, sometimes causes end panels 5, 6 to bend inwardly of the carton. In order to prevent this undesirable result, a pair of panel support fingers 100, 101 are provided at the end of arms 102, 103, respectively. Each said arm is bifurcated at its end opposite fingers 100, 101 so as to be pivotally connected by pivot pins 104, 105, to brackets 106, 107, respectively, secured to frame member 16. Hence, pins 104, 105 extend through both upper and lower forks 108, 109 of each arm 102, 103, and each upper fork 108 is provided with a pin 110 spaced from pivot pins 104, 105. Tension springs 111, 112 are secured between pins 110 and brackets on frame 16 (FIG. 1) for eccentrically urging fingers 100, 101 into the position shown in FIG. 12, yieldably engaging end panels 5, 6 at their junctures with flap extensions 8.

Arms 102, 103 are provided with cam followers 113, 114 at points opposite pivots 104, 105 from pins 110. Cam follower 113 extends downwardly from arm 102 and is in contact with the periphery of cam 89. Likewise cam follower 114 extends upwardly from arm 103 and is in contact with the periphery of cam 88. It will be noted from FIGS. 10, 11, that cam 88, 89 have configurations such that fingers 100, 101, are directed in a predetermined path to follow each carton 1 as it is moved along by conveyor 11.

Just prior to disks 85, 86 contacting flap extensions 8, fingers 100, 101 are brought into yieldable engagement with end panels 5, 6 as shown in FIG. 12. Fingers 100, 101 are directed toward each other and they serve to hold end panels 5, 6 of adjacent cartons 1 against the flight 76 that separates them. During the operation of folding flap extensions 8, fingers 100, 101 follow flight 76 and end panels 5, 6 along the path of travel thereof.

Once the folding operation has been completed by disks 85, 86, arms 102, 103 are cammed to swing fingers 100, 101 outwardly of the path of travel of cartons 1 to the position shown in FIG. 11, where said fingers remain until the succeeding flight 76 is in the position shown in FIG. 12. It is noted that horizontally extending guide bars 115, are provided adjacent the outer edge of cartons 1 and parallel thereto for holding panel extensions 7 in a folded position once the cartons 1 have traveled beyond flap extensions folding mechanisms 12.

Provision is next made for inserting a row of cans 2 (FIG. 2) into the open side of carton 1 opposite mechanism 12. For this purpose a can conveyor generally designated 117, comprising a generally horizontal belt 118, is provided with this upper run substantially coplanar to and parallel with the upper run of carton conveyor 11. Belt 118 may be suitably mounted on pulleys 119 (FIG. 1), one of which is not shown, driven through sprocket and chain drive 120 and shaft 121 by a suitable motor (not shown). Belt 118 travels in the same direction as carton conveyor 11 and guide rails 122, 123 are provided on each side of said belt to maintain a line of cans 2 thereon in upright position.

At a position approximately across from folding mechanism 12 guide rails 122, 123 are terminated. A pair of vertically spaced cross rails 124 are secured to frame 16 and extend angularly across belt 118 toward carton conveyor 11 in the direction of travel of the latter. Said cross rails therefore act to shunt the line of cans being urged forwardly by belt 118 toward the open carton on conveyor 11. The line of cans is automatically timed by projections 81 on flights 76 so that three cans enter each carton by projection 81 on flight 76 which separates the line of cans into such groups of three.

To prevent interference between the top of the cans and the panel extension 7 adjacent thereto, a panel extension support comprising a thin, elongated plate 125 (FIGS. 1, 2) is supported over the top of a line of cans and adapted to engage the underside of the panel extensions 7 integral with top panel 3 of the carton.

As conveyor 11 progresses from the position shown in FIG. 1, progressive groups of three cans are urged by rails 124 into a position between successive flights 76 and the top and bottom panels of the successive cartons carried thereby. Rails 124, however, may not extend into the cartons sufficiently to urge the cans against the opposite closed side of the cartons because of interference between said rails and the unfolded flap extensions on the open side of said cartons. The task of completing the positioning of the cans within the carton is accomplished by flap extension folding mechanisms 13.

The latter mechanism is substantially similar to mechanism 12, previously described, comprising a pair of rotatably mounted disks 126, each having a notch 127 opening outwardly of the periphery thereof. Disks 126 are mounted on a rotatable shaft 128 driven by a pair of meshed bevel gears 129, 130, the latter of which is secured to horizontal shaft 126.

The operation of the notched disks 126 in effecting holding of flap extensions 8 and panel extensions 7 on the open side of the carton is identical to that performed by disks 86, 85 on the opposite side of said carton. It is noted, however, that no provision is made in mechanism 13 of fingers for supporting the end panels during the flap extension folding operation. Such fingers are unnecessary since the cans then residing in a carton provide adequate support for the end panels. The proximity of disks 126 to the cartons urge cans 2 into their proper place adjacent the opposite closed side of the carton during the latter described folding operation. A pair of guide rails 131 are provided parallel to the side edge of the carton adjacent mechanism 13 for the purpose of holding panel extensions 7 in their folded position. Both guide rails 131 and similar guide rails 115 extend to the forward end of carton conveyor 11.

When the carton has passed flap extension folding mechanism 13, the cans are then fully enclosed therein and panel extension 7 and flap extensions 8 on both sides of said carton are in substantially coplanar, opposed relationship. It is in this relationship that the carton is received at the station of flap extension tucking mechanisms 14, 15. Said mechanisms are identical but opposed, one being on each side of the path of travel of carton conveyor 11. Therefore, the structure and operation of mechanism 15 only will be described, that of mechanism 14 to be understood as identical, but opposed thereto.

Tucking mechanisms 14, 15 each comprise a pair of cranks 134, 135 (FIG. 13) each of which is swingable about its own short, vertical shaft 136, 137 to which it is secured. Shafts 136, 137 are journalled for rotation in a pair of bearings 138, 139, secured to a portion of frame 16 and either may be driven by a pair of mesh bevel gears 140, 141 (FIG. 3), the latter of which is secured to horizontal shaft 21 in a case of mechanism 15 and shaft 20 in the case of mechanism 14.

The outer ends of cranks 134, 135 are provided with crank pins 142, 143, respectively, which are secured thereto by means of set screws 144 (FIG. 14). A pair of spaced cross bars 145, 146 are provided with bearings 147 for rotatably receiving crank pins 142, 143. The distance between bearings 147 on each cross bar is equal to the distance between shafts 136, 317, so that cranks 134, 135 are constrained to move in similar, parallel paths.

Pivoted between crank pins 142, 143 on pivot pins 148, 149, journalled in cross bars 145, 146, are a pair of elongated fingers, 150, 151. Said fingers extend generally transversely of conveyor 11 and have tucker blades 152, 153 extending therefrom and adapted to engage flap extensions 8 on cartons 1. Fingers 150, 151 have central arms 154 adjacent pins 148, 149 and extending in opposition to each other. The outer ends of arms 154 are secured to a pair of rods 155 which extends through a back plate 156 secured to cross bars 145, 146. Helical coil springs 157 surrounding each of said rods abut plate 156 and washers 158, secured to the outer end of rods 155, thereby urging fingers 150, 151 in opposite directions and blades 152, 153 toward each other.

At the end of fingers 150, 151 opposite pivot pins 148, 149 from blades 152, 153, each said finger is provided with a rigid yoke 159, 160 extending transversely of each said finger toward each crank 134, 135, respectively. A pair of radial cams 161, 162 are secured, as by set screws 163, to crank pins 142, 143, respectively. At the outer end yokes 159, 160 the same are provided with cam followers 164, 165 in engagement with cams 161, 162. It is obvious therefore, that springs 157 yieldably retain said cam followers in engagement with said cams at all times.

The direction of movement of cranks 134, 135 is shown by arrows 166 in FIG. 13. The structure described causes pivot pins 148, 149 and thence fingers 150, 151 to each move in a generally elliptical path about shafts 136, 137, respectively, as centers. The fact that cams 161, 162 are secured to crank pins 142, 143 causes fingers 150, 151 to swing about pins 148, 149 during such elliptical movement depending upon the configuration of the cams 161, 162.

Said cams are formed such that when cranks 134, 135 are in their starting position, 90 degrees removed in a reversed direction from the position of FIG. 13, blades 152, 153 are parallel and in a position shown by dot-dash lines 167, 168. In this position the outer ends of the blades contact flap extensions 8 on either side of the carton conveyor flight shown at the dot-dash position 169. The fingers first contact the flap extensions near the free outer edges thereof so as to avoid bending the flap extension itself.

Since conveyor 11 is moving in the direction shown by arrow 170, the fingers move in a curved path just clearing the periphery of the end cans 2 in the cartons 1. It is the form of cams 161, 162 combined with the elliptical path of fingers 150, 151 that causes blades 152, 153 to fold flap extensions 8 from a position coplanar with the outside edges of the cartons to a position between the end cans in each carton and end panels 5, 6 of said cartons.

FIG. 13 shows blades 152, 153 in their end positions after completion of the tucking operation. Said fingers then withdraw from the carton along a curved path consistent with the movement of the cartons by conveyor 11. FIG. 1 shows blades 152, 153 generally parallel and in a position removed 180 degrees from that shown in FIG. 13. The operation performed by blades 152, 153 completes the securing of the cans within the carton since flap extensions 8 are then held yieldably by the end cans. The connection between flap extensions 8 and panel extensions 7 assures that the latter remain folded over the side edges of the cans to retain them in the carton.

FIGS. 15 through 20 illustrate the successive steps performed in the method of packing the cans 2 in the display carton 1, without reference to any particular structure. The method illustrated contemplates beginning with a flat collapsed carton shown in FIG. 15, which is supported by its top panel alone. It is noted in FIG. 15 that panel extensions 7 on top panel 3 are of a greater width than those on bottom panel 4 thus providing for such top panel support by dogs 38, 39, as previously explained. The carton is then opened to the position of FIG. 16 in which the panel extensions 7 are coplanar with the top and bottom panels 3, 4 respectively, and flap extensions 8 are coplanar with end panels 5, 6, respectively.

The next step is to fold flap extensions 8 inwardly toward each other (FIG. 17) on one side of the carton only. This also causes panel extensions 7 to be folded toward each other to a generally coplanar relationship with flap extensions 8 (FIG. 18). The row of cans 2 may then be inserted from the open side of carton 1 to a position adjacent the folded panel and flap extensions (FIG. 18). Flap extensions 8 on the other side of carton 1 (the open side) are then folded inwardly to an opposed, generally coplanar relationship as are panel extensions 7 (FIG. 19).

The final step in the operation is the tucking of flap extensions 8 between end panels 5, 6 and the end cans in the row in the carton (FIG. 20). In this manner flap extensions 8 are prevented from folding outwardly of the carton and thereby yieldably retain panel extensions 7 along the upper and lower sides of the cans. The cooperation between cans 2 and flap extensions 8 results in holding the carton in enclosing relation with said cans.

It is obvious that the apparatus and method of this invention could be modified to function with a wider carton capable of holding two or more rows of cans 2 rather than the single row described. In such a modification, rows of cans may be inserted into the fully opened carton of FIG. 16 simultaneously from both sides thereof. In this event, flap extensions 8 could be folded at the same time on both sides of said carton. The remaining steps in packing such a carton are substantially similar to those shown and described.

The collapsed carton of FIG. 15 may also be opened in a different manner, such as holding the bottom panel 4 fixed while expanding the carton upwardly therefrom.

Although the invention has been described and illustrated in detail, such is not to be taken as restrictive thereof, since it is obvious that modifications could be made therein without parting from the spirit and scope of the invention.

I claim:

1. Apparatus for packaging cans in a carton comprising: carton conveying means and can conveying means respectively adapted to support a carton and a row of cans for movement of said carton and cans along separate paths of travel in one general direction with said row extending longitudinally of said direction of movement, means connected with said carton conveying means and with said can conveying means for actuating them for said movement simultaneously, can engaging means at a point in the path of travel of cans for engaging such cans and diverting said row of cans toward and partially into a carton carried by said carton conveying means with the end cans of said row so diverted adjacent to the leading and trailing ends of the carton into which the row is so moved, carton folding means adjacent to said carton conveying means beyond said can engaging means in the direction of movement of said carton conveying means, supported for movement into immediately successive engagement with a leading flap portion of said carton, said cans, and a trailing flap portion of said carton on said carton conveying means for completing movement of said cans into said carton and for bending said portions into yieldably holding engagement with said end cans of the row that has been moved into said carton by said can engaging means and said carton folding means, and means for so moving said carton folding means.

2. Apparatus for packing articles in a display carton having connected top, bottom and end panels, panel extensions foldable from said top and bottom panels to opposed coplanar positions across both sides of said carton, and flap extensions connected with said panel extensions and foldable from said end panels into the space between said end panels and said articles for holding said panel extensions in said coplanar positions, said apparatus comprising: conveyor means for moving an open rectangular carton longitudinally along a generally horizontal path of travel, including means for retaining said cartons in said rectangular form, means for folding said panel extensions and said flap extensions into opposed, coplanar relationship on one side of said carton, including means for supporting said end panels during said folding, means for inserting a row of articles into said carton from the other side thereof, said row extending longitudinally from substantially one end panel to the other of said carton, means for folding said panel extensions and said flap extensions into opposed, coplanar relationship on the other side of said carton, and means for tucking said flap extensions between said end panels and the end of said row of articles for holding said panel extensions in enclosing relationship with said row.

3. Apparatus for packing articles in a display carton having connected top, bottom and end panels, panel extensions foldable from said top and bottom panels to opposed coplanar positions across both sides of said carton, and flap extensions, connected with said panel extensions and foldable from said end panels into the space between said end panels and said articles for holding said panel extensions in said coplanar positions, said apparatus comprising: means for supporting a flat collapsed carton in a stack by one only of its top and bottom panels, means for expanding said carton, while so supported, into an upright, rectangular, fully open condition with said panel extensions and said flap extensions coplanar with said top and bottom panels and said end panels, respectively, conveyor means for moving said open carton longitudinally along a generally horizontal path of travel, means for folding said panel extensions and said flap extensions into opposed, coplanar relationship on one side of said carton, means for inserting a row of articles into said carton from the other side thereof, said row extending longitudinally from substantially one end panel to the other of said carton, means for folding said panel extensions and said flap extensions into opposed, coplanar relationship on the other side of said carton, and means for tucking said flap extensions between said end panels and the ends of said row of articles for holding said panel extensions in enclosing relationship with said row.

4. Apparatus for packing articles in a display carton having connected top, bottom and end panels, panel extensions foldable from said top and bottom panels to opposed coplanar positions, across both sides of said carton, and flap extensions, connected with said panel extensions and foldable from said end panels into the space between said end panels and said articles for holding said panel extensions in said coplanar positions, said apparatus comprising: means for feeding said cartons in a flat, collapsed condition in a generally vertical stack, means for supporting each successive carton in said stack by one only of its top and bottom panels, means for expanding said carton, while so supported, into an upright, rectangular, fully open condition with said panel extensions and said flap extensions coplanar with said top and bottom panels and said end panels, respectively, conveyor means for moving said open carton longitudinally along a generally horizontal path of travel, means for folding said panel extensions and said flap extensions into opposed, coplanar relationship on one side of said carton, means for inserting a row of articles into said carton from the other side thereof, said row extending longitudinally from substantially one end panel to the other of said carton, means for folding said panel extensions and said flap extensions into opposed, coplanar relationship on the other side of said carton, and means for tucking said flap extensions between said end panels and the ends of said row of articles for holding said panel extensions in enclosing relationship with said row.

5. Apparatus for packing articles in a display carton having connected top, bottom and end panels to opposed coplanar positions across both sides of said carton, and flap extensions connected with said panel extensions and foldable from said end panels into the space between said end panels and said articles for holding said panel extensions in said coplanar positions, said apparatus comprising: means for feeding said cartons in a flat, collapsed condition in a generally vertical stack, means for supporting the lowermost carton in said stack by its top panel only, means for expanding said carton, while so supported, into an upright, rectangular, fully open condition with said panel extensions and said flap extensions coplanar with said top and bottom panels and said end panels, respectively, conveyor means for moving said open carton longitudinally along a generally horizontal path of travel, means for folding said panel extensions and said flap extensions into opposed, coplanar relationship on one side of said carton, means for inserting a row of articles into said carton from the other side thereof, said row etxending longitudinally from substantially one end panel to the other of said carton, means for folding said panel extensions and said flap extensions into opposed, coplanar relationship on the other side of said carton, and means for tucking said flap extensions between said end panels and the ends of said row of articles for holding said panel extensions in enclosing relationship with said row.

6. Apparatus for packing articles in a display carton having connected top, bottom and end panels, panel extensions foldable from said top and bottom panels to opposed coplanar positions across both sides of said carton, and flap extensions connected with said panel extensions and foldable from said end panels into the space between said end panels and said articles for holding said panel extensions in said coplanar positions, said apparatus comprising: means for feeding said cartons in a flat, collapsed condition in a generally vertical stack, means for supporting the lowermost carton in said stack by its top panel only, means for expanding said carton, while so supported, into an upright, rectangular, fully open condition with said panel extensions and said flap extensions coplanar with said top and bottom panels and said end panels, respectively, conveyor means for moving said open carton longitudinally along a generally horizontal path of travel, including means for retaining said cartons in said rectangular form, means for folding said panel extensions and said flap extensions into opposed, coplanar relationship on one side of said carton, including means for supporting said end panels during said folding, means for inserting a row of articles into said carton from the other side thereof, said row extending longitudinally from substantially one end panel to the other of said carton, means for folding said panel extensions and said flap extensions into opposed, coplanar relationship on the other side of said carton, and means for tucking said flap extensions between said end panels and the ends of said row of articles for holding said panel extensions in enclosing relationship with said row.

7. Apparatus for associating cans and carton forms for packaging, comprising: carton form conveying means and can conveying means respectively adapted to support a line of carton forms and a plurality of cans for movement of said forms and said cans along separate paths of travel in one general direction, guide means at a point along said paths for progressively shifting cans from said can conveying means toward said carton form conveying means for moving said cans onto said forms, means for driving said carton form conveying means, means for driving said can conveying means effective to keep a row of cans in abutting relation against said guide means, and a plurality of elements on said carton form conveying means spaced apart the length of a carton form in said direction and engageable between cans being shifted by said guide means for separating said row into successive form-filling groups as the same are so shifted and constraining the remainder of said row to move at the speed of said carton form conveyor.

8. Apparatus for packing articles in a carton of the type having foldably connected top and bottom panels and opposite end panels and panel extensions and flap extensions respectively foldably connected to the side edges of said top and bottom panels and said end panels, said apparatus comprising:

(a) a magazine for supporting a generally vertically extending stack of such cartons in flat, collapsed condition, each with its top panel and one end panel in overlying engagement with its bottom panel and opposite end panel and with said panel extensions and said flap extensions respectively coplanar therewith;

(b) conveying means for successively feeding the lowermost carton from said stack away from said magazine in a direction extending longitudinally of said side edges;

(c) means for initiating expansion of said carton to an open condition, including
  (1) means movable generally in said direction and engageable with the trailing end of said carton for separating its top and bottom panels from each other, and
  (2) stationary means engageable under the panel extensions on said top panel for supporting said top panel during such separating;

(d) said conveying means including means for conveying said carton in rectangular, fully open condition;

(e) article feeding means for delivering articles to and filling said carton in said fully open condition through an open side thereof; said, (f) means for folding said panel extensions and said flap extensions to close said open sides of said carton.

9. The apparatus of claim 8, in which:

(g) said conveying means further includes a plurality of upstanding flights movable in said direction and spaced apart substantially the length of said top and bottom panels; and, (h) means supporting said flights in a position to receive said carton between an adjacent pair thereof from said initiating means for completing expansion of said carton to a rectangular, fully open condition.

References Cited in the file of this patent

UNITED STATES PATENTS

| | | |
|---|---|---|
| 1,489,134 | Ladd | Apr. 1, 1924 |
| 2,662,356 | Swafford | Dec. 15, 1953 |
| 2,669,076 | Ormsby | Feb. 16, 1954 |
| 2,681,143 | Guyer | June 15, 1954 |
| 2,687,800 | Weimer | Aug. 31, 1954 |
| 2,756,553 | Ferguson et al. | July 31, 1956 |
| 2,817,196 | Ringler | Dec. 24, 1957 |
| 3,058,271 | McGihon | Oct. 16, 1962 |